United States Patent [19]

Sziklas et al.

[11] 4,164,366
[45] Aug. 14, 1979

[54] VARIABLE OUTPUT COUPLED RESONATOR

[75] Inventors: Edward A. Sziklas; Robert J. Freiberg, both of N. Palm Beach, Fla.

[73] Assignee: United Technologies Corporation, Hartford, Conn.

[21] Appl. No.: 848,792

[22] Filed: Nov. 4, 1977

[51] Int. Cl.² .............................................. H01S 3/05
[52] U.S. Cl. .............................. 350/299; 331/94.5 C
[58] Field of Search ..................... 331/94.5 C, 94.5 D; 350/294, 299

[56] References Cited

U.S. PATENT DOCUMENTS 4,126,381  11/1978  Chodzko et al. ............... 331/94.5 C

*Primary Examiner*—William L. Sikes
*Attorney, Agent, or Firm*—Lawrence A. Cavanaugh

[57] ABSTRACT

A variable output resonator is disclosed having a mode control cavity and a power extraction cavity both capable of being independently optimized to produce a laser beam having high power and good optical quality in the far field. A cone having a conical reflective surface is adapted to be linearly moved along a beam axis of the power extraction cavity in the resonator to intercept a portion of the radiation circulating therein to produce the laser beam. Both the diameter and power level of the laser beam are dependent upon the area of the reflective surface of the cone which interacts with the radiation circulating within the resonator. The insertion of the cone into the resonator does not influence the overall resonator alignment since the cone is external to the optical components defining the resonator. An embodiment of the present invention further includes means for varying the cross-sectional area of the radiation circulating within the resonator as it passes between the mode control cavity and the power extraction cavity.

15 Claims, 3 Drawing Figures

VARIABLE OUTPUT COUPLED RESONATOR

BACKGROUND OF THE INVENTION

The present invention relates to radial flow lasers and more particularly to an optical resonator capable of producing an output beam having both diameter and power level capable of being varied.

Laser systems which provide an output beam at a very high power level such as those made possible with a combustion driven chemical laser are subject to various restraints which limit the beam quality and output power from such a system. One of these limitations is due to a phenomenon which is commonly referred to as superfluorescene, a condition under which a gain medium having a population inversion produces spurious beams of laser radiation that do not interact with any of the optical components of the resonator. The spurious beams are undesirable because they deplete the population inversion which would otherwise be available for controlled stimulated emission from the working medium.

One of the concept advances to increase the amount of working medium available without incurring superfluoresence effects is disclosed by Freiberg et al in the U.S. Pat. No. 3,969,687 entitled "Standing Wave Unstable Resonators for Radial Flow Lasers" filed on Apr. 14, 1975 and held with the present application by a common assignee. The unstable resonator is formed having a centerline axis with a gain region in the configuration of a thin wall cylinder disposed symmetrically about the centerline axis. A cylindrical gas source region is disposed adjacent to the interior of the gain region and symmetrically about the centerline axis. The system optics form an unstable resonator capable of providing an output beam having an annular cross-section. The resonator is a standing wave positive branch confocal device in which toroidal and annular mirrors are utilized.

The complex optical reflecting surfaces utilized with chemical lasers are extremely difficult and costly to manufacture, especially for high power applications for which water-cooling is required. A stable optical resonator employing simple optical reflecting surfaces and capable of being used in chemical lasers is disclosed by Sziklas in U.S. Pat. application Ser. No. 789,751 entitled "Stable Optical Resonator" filed on Apr. 21, 1977 and held with the present application by a common assignee. A stable resonator is provided which is disposed symmetrically about a centerline axis, having an optical cavity defined at one end by an unstable resonator and at the other end by a reflector. The unstable resonator comprises a convex mirror and a concave mirror. A flat reflector in optical communication with the unstable resonator is capable of retroreflecting the output of the unstable resonator back into the unstable resonator. When an active medium is disposed between the unstable resonator and the reflector, the resonator is capable of providing an output beam having high power and high optical quality. High optical quality of the beam results from the effective discrimination against high order transverse modes provided by the unstable resonator.

A resonator having coupled cavities is disclosed by Sziklas in application Ser. No. 848,697 entitled "Resonator Having Coupled Cavities With Intercavity Beam Expansion Elements" filed on Nov. 4, 1977 and held with the present application by a common assignee. The resonator described therein includes a mode control cavity, a power extraction cavity, a stripper mirror for out coupling a laser beam from the resonator and a conical mirror capable of varying the diameter of a beam of radiation circulating within the resonator and of optically coupling the cavities. In one embodiment the apex of the conical mirror has a convex reflective surface which defines one end of the mode control cavity. The laser beam produced by the resonator has an annular cross-section.

Freiberg in U.S. Pat. No. 4,025,172 entitled "Compound Unstable Resonator" filed Oct. 9, 1975 and held with the present application by a common assignee discloses an unstable resonator having an annular end mirror, a circular end mirror and a conical folding mirror disposed symmetrically about a centerline axis through the resonator wherein the apex of the conical mirror and the center of the circular mirror have reflective surfaces modified to form an unstable resonator therebetween. The circular mirror disclosed therein has a compound radius of curvature which is difficult to fabricate.

Prior art resonators employ complex optical reflective surfaces which are difficult to manufacture or employ a single optical cavity in which the conditions for providing an output beam having both high power and good optical quality cannot be independently optimized. Also, prior art resonators adapted for accommodating gain media having a large volume require mode control resonators having a large separation between the optical components defining the mode control resonator to provide an output beam having good optical quality. Additionally, both the power level and diameter of the output beam cannot be varied during the operation of the resonator without affecting the resonator performance.

SUMMARY OF THE INVENTION

A primary object of the present invention is to provide an output beam having both high power and good optical quality with a resonator capable of accommodating a large volume of gain medium.

According to the present invention a resonator formed with optically connected cavities comprises a mode control cavity having a centerline axis and defined at one end by a first mirror and at the other end by a second mirror, a power extraction cavity having a beam axis and defined at one end by a first retroreflector and at the other end by a first reflector wherein the centerline axis does not superpose the beam axis and the mode control cavity is in line of sight communication with the power extraction cavity, and means for coupling radiation from the resonator. A particular embodiment further includes means for varying the cross-sectional dimensions of radiation passing between the mode control cavity and the power extraction cavity.

A primary feature of the present invention is a cone centrally located within the first retroreflector adapted to be removably insertable into the resonator. Additionally, the power extraction cavity is adapted to accommodate a gain medium having a large volume. Optical power is extracted from the gain medium within the power extraction cavity and mode discrimination of the radiation circulating within the resonator is accomplished in the mode control cavity. Additionally, a second retroreflector in line of sight communication with the mode control cavity through an aperture in the first reflector is capable of retroreflecting a portion of the radiation passing out of the mode control cavity back into the mode control cavity.

A feature of an embodiment of the present invention is a turning mirror for providing line of sight communication between the mode control cavity and the power extraction cavity. A feature of a further embodiment of the present invention is a convex reflective surface on the turning mirror adapted to vary the diameter of the beam passing in and out of the mode control region. Additionally, a collective mirror in line of sight communication with the turning mirror is capable of collimating the beam expanding from the convex surface on the turning mirror and directing the expanded collimated beam to the power extraction region. Also, a piezoelectric actuator attached to one of the mirrors defining one of the optical cavities is capable of adjusting the separation between the elements defining the cavity to optimize the optical quality of the output beam.

A primary advantage of the present invention is the high optical quality of the output beam obtained by the effective discrimination against high order transverse modes provided by the mode control cavity. Additionally, retroreflectors having conical surfaces serve to minimize the alignment tolerances associated with the resonator performance. Also, the resonator characteristics established by the elements defining the resonator are not affected by the movement of the cone in the resonator resulting in the ability to vary the diameter and power level of an output beam without affecting the alignment tolerances of the resonator. The resonator employs simple optical elements and spider mounts are not required to maintain the alignment of the optical components. Additionally, the resonator formed with coupled cavities allows independent optimization of the mode control cavity and the power extraction cavity. A primary advantage of an embodiment of the present invention is the ability to incorporate a large volume gain medium within the power extraction cavity to provide a resonator capable of producing a high power laser beam while maintaining a relatively compact mode control cavity capable of providing good mode control to the laser beam. An advantage of a further embodiment is the ability to provide a compact resonator by utilizing a turning mirror to fold the optical path of the resonator.

The foregoing and other objects, features and advantages of the present invention will become more apparent in the light of the following detailed description of the preferred embodiments thereof as discussed and illustrated in the accompanying drawing.

DESCRIPTION OF THE PREFERRED EMBODIMENT

Figure 1:
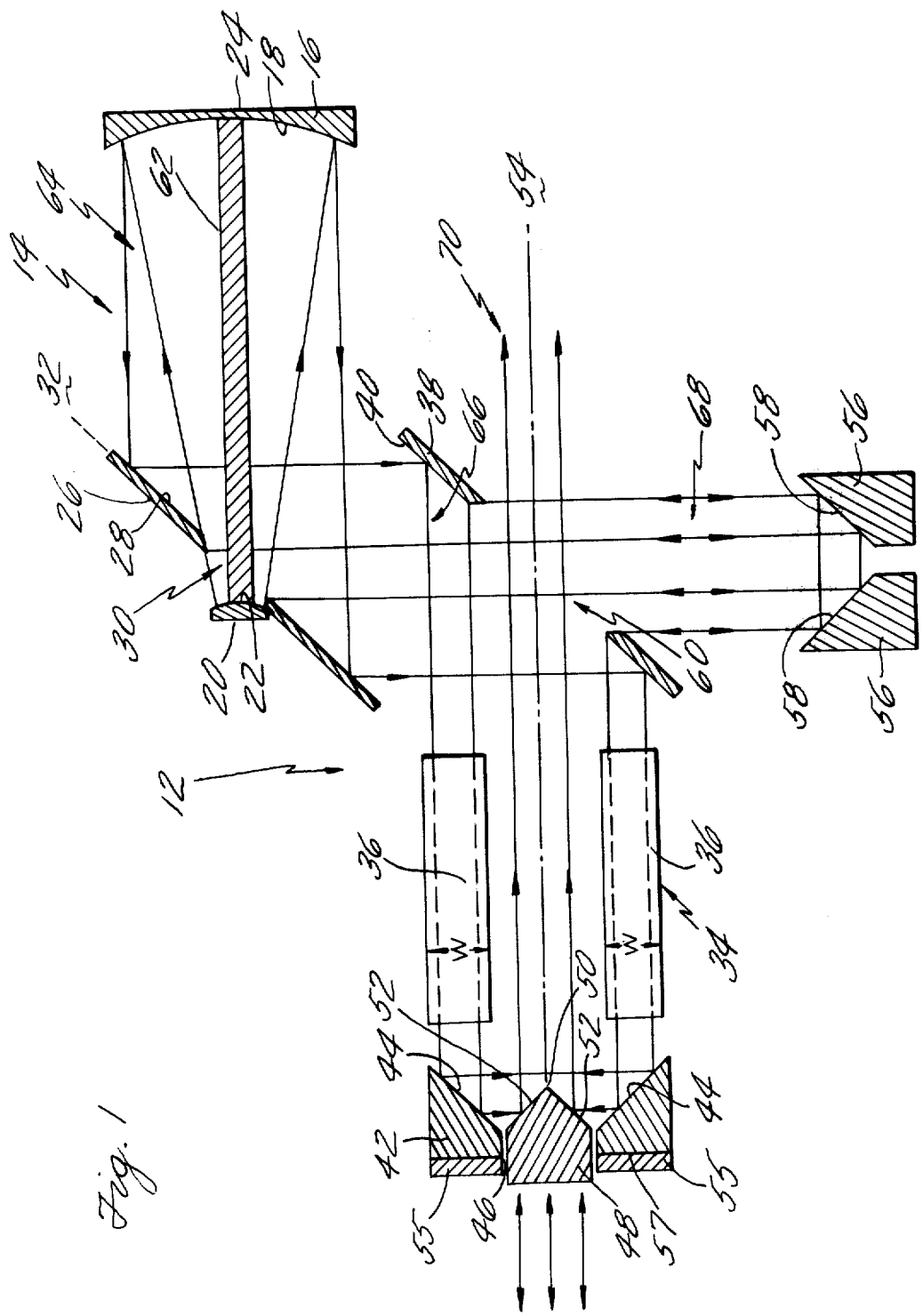
FIG. 1 is a simplified schematic of a variable output resonator having coupled cavities in accordance with the present invention.

A resonator 12 having coupled cavities in accordance with the present invention is shown in FIG. 1. A mode control cavity 14 defined at one end by a first mirror 16 having a concave reflective surface 18 and at the other end by a second mirror 20 having a convex reflective surface 22 is shown with each mirror positioned on and concentrically about a centerline axis 24. A turning mirror 26 having a reflective surface 28 with an aperture 30 centrally located therein is positioned on and concentrically about the centerline axis adjacent to the second mirror and has an axis 32 through the plane of the mirror forming an angle less than ninety degrees with the centerline axis 24. A power extraction cavity 34 capable of accommodating an annular gain medium 36 is defined at one end by a reflector 38 having a reflective surface 40 and at the other end by a first retroreflector 42 having a conical reflective surface 44 with an aperture 46 centrally located therein. A cone 48 having an apex 50 and a conical reflective surface 52 is centrally located within the aperture 46 in the first retroreflector 42. The gain medium, the first retroreflector, the cone and the reflector mirror are all located on and concentrically about a beam axis 54. The reflector 38 is in line of sight communication with the turning mirror 26 and with the first retroreflector 42. A second retroreflector 56 having a conical reflective surface 58 is positioned in line of sight communication with the reflective surface 28 of the turning mirror 26 through an aperture 60 in the reflector 38. A piezoelectric activator 55 is attached to the back surface 57 of the first retroreflector 42.

The mode control cavity 14 is a positive branch confocal unstable resonator having large geometric magnification and a low Fresnel number to provide mode discrimination against higher order radial and azimuthal modes such that the lowest loss mode, typically the lowest order fundamental mode, is strongly favored. The mode control cavity is a converging-diverging optical system capable of expanding and compressing electromagnetic radiation circulating therein by repeated reflections between the first and second mirrors 16 and 20. In operation, the radiation within the mode control cavity is compressed toward the centerline axis 24 by multiple reflections between the concave and convex surfaces of the first and second mirrors into a diffraction dominated portion 62 of the mode control cavity. Eventually, diffractive spreading causes the compressed inwardly propagating radiation to expand which transforms the compressed radiation into an outwardly propagating radiation, having a lowest loss mode, which fills the entire surface area of the second mirror 20. The radiation further expands to the first mirror 16 where it is reflected to the turning mirror 26 as a collimated beam of radiation 64 having an annular cross-section. The reflective surface 28 of the turning mirror directs the collimated beam 64 to the reflector 38 defining one end of the power extraction cavity 34. The reflective surface 40 of the reflector 38 directs the outer diameter portion 66 of the collimated beam of radiation through the gain medium 36 within the power extraction cavity 34 and is incident onto the first retroreflector 42. The beam efficiently extracts energy from the gain medium as it passes therethrough. The beam is inverted and retroreflected by the conical reflective surface 44 of the first retroreflector back through the gain medium where additional energy is extracted and is directed into the mode control cavity by the reflector 38 and the turning mirror 26 where the beam is compressed by repeated reflections between the concave and convex surfaces of the first and second mirrors until diffractive spreading causes the radiation to expand the propagate out of the mode control region repeating the above described operation. The inner diameter portion 68 of the beam passes through the aperture 60 in the reflector 38 and is inverted and retroreflected by the reflective surface 58 of the second retroreflector 56 to the reflective surface 28 of the turning mirror and directed back into the mode control cavity 14. The second retroreflector 56 increases the operating efficiency of the resonator by retroreflecting and inverting radiation lost from the resonator back into the mode control cavity 14. The aperture 60 in the reflector is also utilized to pass a laser beam 70 as hereinafter described. The aperture 60 is sized to accommodate the maximum diameter of the laser beam. It is to be recognized that for certain applications the size of the aperture will allow all of the radiation passing out of the mode control cavity to be reflected into the gain medium 36 by the reflector 38. For these applications the second retroreflector 56 is not required.

The turning mirror 26 is positioned in the mode control cavity 14 such that the radiation, having multiple reflections between the concave and convex surfaces of the first and second mirrors passes through the aperture 30 on each reflection. This configuration obviates the use of spider mounts or the like for maintaining the position of the second mirror. The off axis position of the mode control cavity as shown in FIG. 1 results in a comparatively compact resonator capable of providing an output beam having high power with good optical quality in the far field from a resonator having a large volume gain medium.

The operation of many high power lasers requires that the optical flux in the gain region of the resonator be as high as possible to efficiently saturate the gain of the working medium and to effectively extract the available power from the resonator. This is particularly important for regions exhibiting the largest small signal gain such as those near the inside surface of the cylindrical sheath of the gain region. An inability to saturate the extraction process limits the power output from such a resonator to something less than what is otherwise available. The collimated annular beam of radiation 64 of the present invention is particularly suited for power extraction from the annular gain configuration of chemical lasers having dimensions consistent with the requirements of superfluoresence.

The cone 48 centrally positioned within the central portion of the first retroreflector 42 is adapted to be linearly moved in the resonator along the beam axis of the power extraction cavity through the aperture 46. As the cone is moved within the resonator the conical reflective surface 52 intercepts a variable portion of the radiation circulating within the resonator to form the laser beam 70 which passes through the aperture 60 within the reflector 38. The laser beam 70 has a continuous cross-section and good optical quality resulting from the proper transformation of the beam within the mode control cavity to produce effective diffractive cross-coupling of the phase fronts from various portions throughout the gain region. This cross-coupling transforms the annular portions of the collimated beam of radiation 64 into the laser beam 70, all portions of which are in phase coherence with one another. The actual diffractive cross-coupling occurs in the immediate vicinity of the centerline axis 24 which is the diffraction dominated portion 62 of the mode control cavity. The diameter of the laser beam 70 and the power within the beam is controlled by the amount of the surface area of the conical reflective surface 52 of the cone 48 which intercepts the beam of radiation circulating within the resonator. Within limits, the greater the insertion of the cone into the radiation circulating within the resonator, the greater the diameter and power level of the laser beam. The power of the output beam will increase as the cone is inserted into the resonator until the coupling losses of the cone reduce the optimum gain of the resonator. Further insertion of the cone into the resonator will result in a reduction in the power of the output beam. The complete removal of the cone will eliminate the output beam.

A significant advantage of utilizing a cone adapted to be linearly moved within the resonator along the beam axis of the power extraction cavity is that both the power and diameter of the output beam can be varied continuously during operation without major changes in the resonator configuration. In addition, the insertion of the cone into the resonator does not influence the overall resonator alignment tolerances since the cone is external to the optical components defining the optical cavity. For high power operation, the apex 50 of the cone may be rounded to avoid being burned off by the high power density within the resonator. The rounded apex will have negligible affect on the far field characteristics of the output beam. The utilization of retroreflectors in the resonator are preferred because they tend to be self-aligning and minimize alignment tolerances associated with resonator performance. Also, since retroreflectors continuously interchange the radiation circulating within the resonator left for right and vice versa, individual contributions to overall misalignment tend to be self-compensating. In addition, with the use of retroreflectors, the influence of azimuthal non-uniformities within the active gain medium tend to be averaged out as the radiation circulates through the active gain medium.

Resonators having coupled cavities operating in a cooperative fashion require the resonator length to be appropriately controlled. One method of controlling the length is to attach an activator such as a piezoelectric activator 55 to the back of a mirror defining one of the cavities. Although the activator may be attached to any of the optical elements defining a cavity such as the first and second mirrors, it is preferred that the actuator be attached to an element having minimum effect on the quality of the output beam such as the first retroreflector 42. The activator is capable of moving the mirror in the forward or reverse direction to vary the separation between the elements defining the cavity to optimize the optical quality of the output beam. Typically, the mirrors are moved a distance less than a few wavelengths of the radiation circulating within the resonator.

Figure 2:
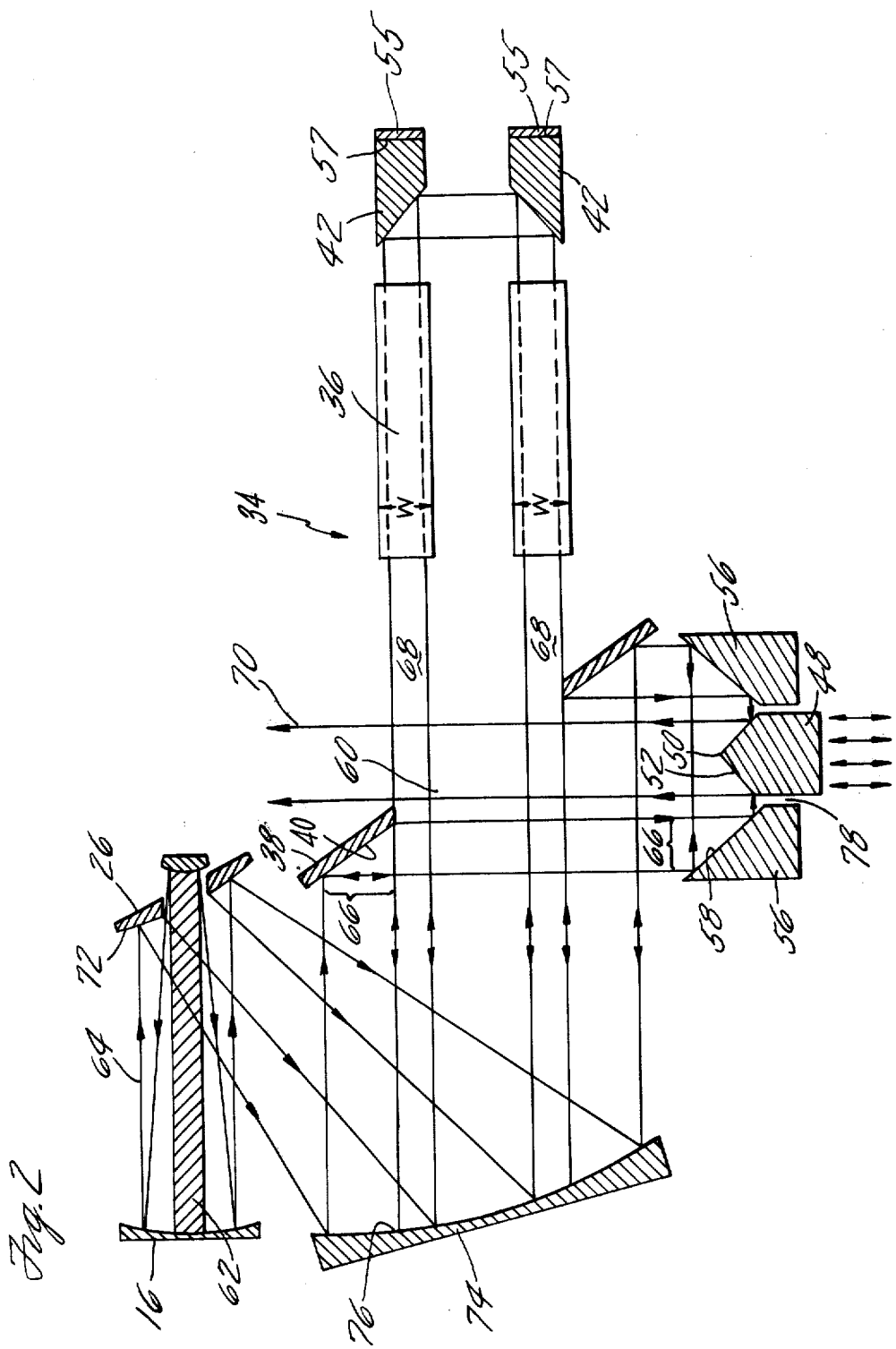
FIG. 2 is a simplified schematic of an embodiment of the present invention showing means for varying the cross-sectional area of radiation circulating within the resonator.

FIG. 2 shows an embodiment of the present invention in which the turning mirror 26 has a convex reflecting surface 72 and further includes a collecting mirror 74 having a concave reflective surface 76 capable of cooperating with the convex reflective surface of the turning mirror to change the cross-sectional area of the beam passing in and out of the mode control cavity. In operation, the collimated annular beam of radiation 64 incident onto the convex reflective surface 72 of the turning mirror 26 is expanded to the collecting mirror 74 where the concave reflective surface 76 recollimates the radiation and directs the expanded collimated radiation to the power extraction region 34. The inner diameter portion 68 of the expanded radiation passes through the aperture 60 within the reflector 38, is amplified by the annular gain medium 36 and retroreflected by the first retroreflector 42 back through the gain medium to the collecting mirror. The cross-sectional area of the circulating radiation is reduced as the radiation is compressed into the mode control cavity by the collecting mirror cooperating with the convex surface on the turning mirror. The outer diameter portion 66 of the expanded collimated beam of radiation is reflected by the reflective surface 40 of the reflector 38 to the second retroreflector 56. The radiation is inverted and retroreflected by the conical reflective surface 58 of the second retroreflector to the reflector 38 and passed into the mode control cavity by the collecting mirror 74 and the convex surface 72 of the turning mirror 26. The output beam 70 is out coupled from the resonator by the cone 48 centrally located within an aperture 78 in the second retroreflector in the same manner as hereinbefore discussed. The cone 48 is capable of being removably inserted into the resonator to control the laser beam power and diameter.

The laser beam resulting from the configuration shown in FIG. 1 has a diameter limited in cross-sectional area to twice the thickness w of the gain medium 36. The embodiment as shown in FIG. 2 can be utilized for applications requiring a large beam diameter or when very high power is required such that the power density of the circulating beam of radiation within the resonator exceeds the thermal loading capabilities of the cone. The diameter of the output beam extracted from the larger diameter portion of the expanded annular beam within the resonator is not limited by the radial width of the gain medium. As in the preferred embodiment, the resonator has a power extraction cavity and a mode control cavity.

The Fresnel number $N_f$ of a resonator is defined as $N_f = d^2/\lambda L$ where d is the diameter of the beam within the resonator, $\lambda$ is the wavelength of the radiation and L is the separation distance between the optical components defining the resonator. As hereinbefore discussed, good optical quality of the laser beam requires a low Fresnel number. As the diameter of a gain medium is increased, the diameter of the radiation within the resonator also increases, requiring an increase in separation between the optical components defining the resonator to maintain a low value of $N_f$. For the configuration as shown in FIG. 1, large diameter radiation within the resonator requires a mode control cavity having a large separation between the first and second mirrors to maintain the low Fresnel number. Providing an expanded beam of radiation to the power extraction cavity and a compressed beam to the mode control cavity as shown in FIG. 2 produces the capability of efficiency extracting power from a large volume gain medium while simultaneously allowing a relatively compact mode control cavity to produce a laser beam having near diffraction-limited beam quality and high power.

Figure 3:
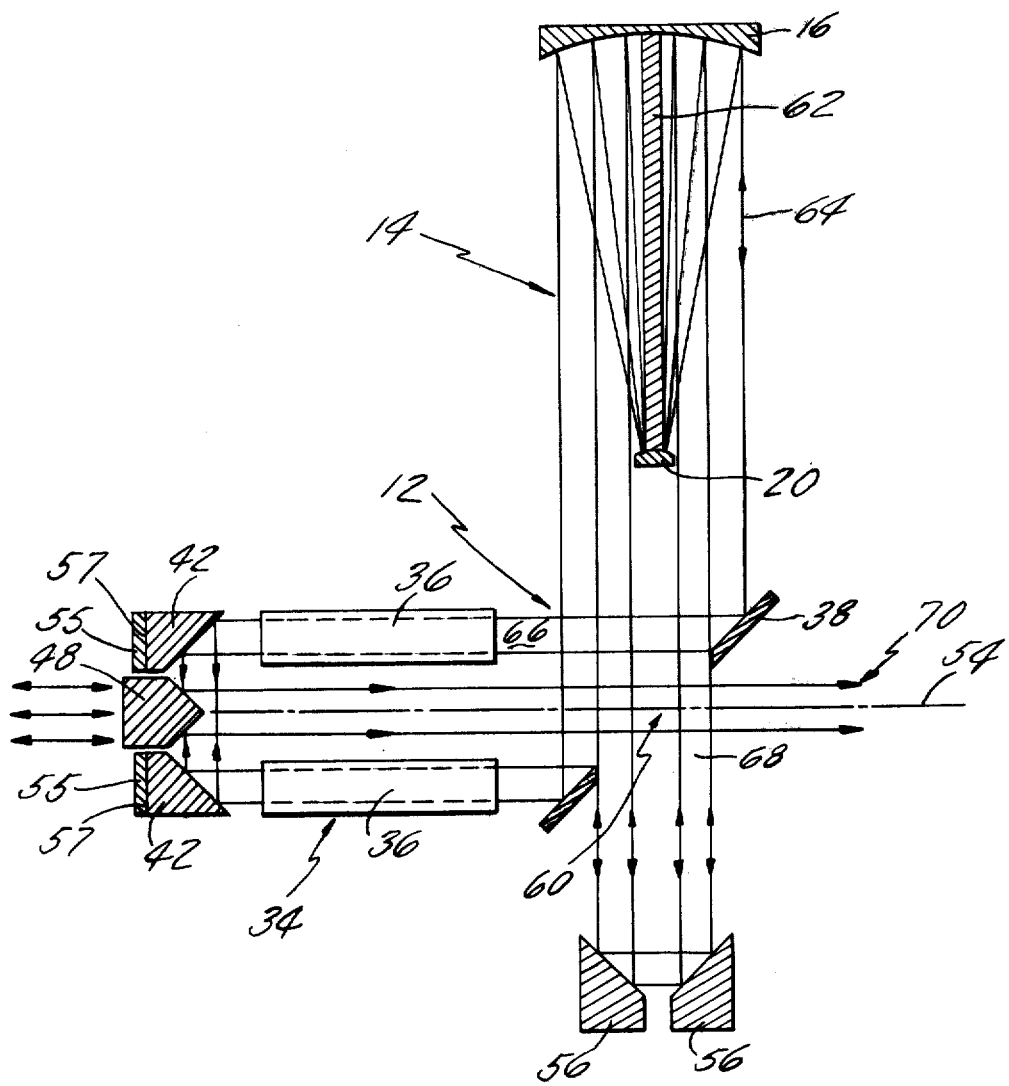
FIG. 3 is a simplified schematic of an embodiment of the present invention showing direct coupling between the coupled cavities.

FIG. 3 shows an embodiment of the present invention in which the centerline axis 24 of the mode control cavity 14 is disposed in a perpendicular relationship to the beam axis 54 of the power extraction cavity 34. The collimated radiation 64 passing out of the mode control cavity is passed directly into the power extraction cavity without the utilization of a turning mirror such as the turning mirror 26 as shown in FIG. 1. It is to be understood that the centerline axis may intercept the beam axis at any angle which allows the collimimated beam 64 passing out of the mode control cavity to be incident into the reflector 38, be directed through the gain medium and retroreflected back through the gain medium into the mode control cavity. The mode control cavity must be positioned relative to the power extraction cavity to form a resonator having optically coupled cavities in which radiation circulating within the resonator passes between the mode control cavity and the power extraction cavity. The resonator as shown in FIG. 3 has the advantage of having fewer optical elements than the resonator as shown in FIG. 1.

Although the invention has been shown and described with respect to preferred embodiments thereof it should be understood by those skilled in the art that various changes and omissions in the form and detail thereof may be made therein without departing from the spirit and scope of the invention.

Having thus described typical embodiments of our invention, that which we claim as new and desire to secure by Letters Patent of the United States is:

1. A resonator comprising:
   a mode control cavity defined at one end by a first mirror having a concave reflective surface and at the other end by a second mirror having a convex reflective surface wherein the first and second mirrors are positioned on and symmetrically about an axis through a centerline of the mode control cavity;
   a power extraction cavity defined at one end by a first retroreflector and at the other end by a first reflector wherein the first retroreflector and the first reflector are positioned on and symmetrically about a beam axis wherein the beam axis does not superpose the axis through the centerline of the mode control cavity;
   means for optically coupling the mode control cavity and the power extraction cavity; and
   a cone having a conical reflective surface centrally located within an aperture in the first retroreflector and adapted for coupling the radiation out of the resonator as an output beam having a continuous cross section.

2. The invention in accordance with claim 1 further including a gain medium disposed in the power extraction cavity symmetrically about the beam axis.

3. The invention in accordance with claim 2 wherein the gain medium has an annular configuration.

4. The invention in accordance with claim 1 wherein the surfaces of the first and second mirrors are in optical communication with each other forming a positive branch confocal unstable resonator having large geometric magnification and low Fresnel number.

5. The invention in accordance with claim 1 wherein the cone is linearly adjustable along the beam axis of the power extraction cavity to intercept a variable portion of a beam of radiation circulating within the resonator to provide an output beam capable of having both variable power and beam diameter.

6. The invention in accordance with claim 1 further including a second reflector, optically coupled to the mode control cavity with line of sight communication through an aperture in the first reflector, adapted to reflect a portion of a circulating beam of radiation passing out of the mode control cavity back into the mode control cavity.

7. The invention in accordance with claim 6 wherein the second reflector is a second retroreflector.

8. The invention in accordance with claim 1 wherein the means for optically coupling the mode control cavity and the power extraction cavity is a turning mirror, positioned on and symmetrically about the axis through the centerline of the mode control cavity, adapted to pass a circulating beam of radiation between the mode control cavity and the power extraction cavity.

9. The invention in accordance with claim 8 further including means for varying the diameter of a beam of radiation, circulating within the resonator, as the radiation passes between the mode control cavity and the power extraction cavity.

10. The invention in accordance with claim 9 wherein the means for varying the diameter of a beam of radiation circulating within the resonator includes:
a first turning mirror having a convex reflective surface positioned on and symmetrically about the axis through the centerline of the mode control cavity and adapted to expand the radiation passing out of the mode control cavity and of collimating the radiation passing into the mode control region; and
a collector mirror having a concave surface adapted to collimate the beam expanding from the convex reflective surface of the turning mirror and directing the collimated beam to the power extraction cavity and of converging the radiation passing from the power extraction cavity and directing the converging radiation to the turning mirror.

11. The invention in accordance with claim 10 further including a gain medium having an annular configuration and disposed in the power extraction region symmetrically about the beam axis.

12. The invention in accordance with claim 1 further including activator means for controlling the separation between the first retroreflector and the first reflector to optimize the quality of the output beam.

13. The invention in accordance with claim 12 wherein the activator means is a piezoelectric activator.

14. The invention in accordance with claim 1 further including activator means for controlling the separation between the mirrors defining the mode control cavity.

15. A resonator comprising:
a mode control cavity defined at one end by a first mirror having a concave reflective surface and at the other end by a second mirror having a convex reflective surface wherein the first and second mirrors are positioned on and symmetrically about an axis through a centerline of the mode control cavity;
a power extraction cavity defined at one end by a first retroreflector and at the other end by a first reflector wherein the first retroreflector and the first reflector are positioned on and symmetrically about a beam axis wherein the beam axis does not superpose the axis through the centerline of the mode control cavity;
means for optically coupling the mode control cavity and the power extraction cavity;
a second retroreflector, optically coupled to the mode control cavity with line of sight communication through an aperture in the first reflector, adapted to reflect a portion of a circulating beam of radiation passing out of the mode control cavity back into the mode control cavity; and
a cone, having a conical reflective surface centrally located within an aperture in the second retroreflector, linearly adjustable along the beam axis of the power extraction cavity to intercept a variable portion of a beam of radiation circulating within the resonator to provide an output beam having a diameter independent of the width of the gain medium and a power level proportional to the area of the reflective surface intercepting the beam of radiation circulating within the resonator.

* * * * *